J. OFFINEER,
Assignor, by mesne assignments, to H. HOLT & Co.
Hay Knife.
No. 9,335. Reissued Aug. 3, 1880.
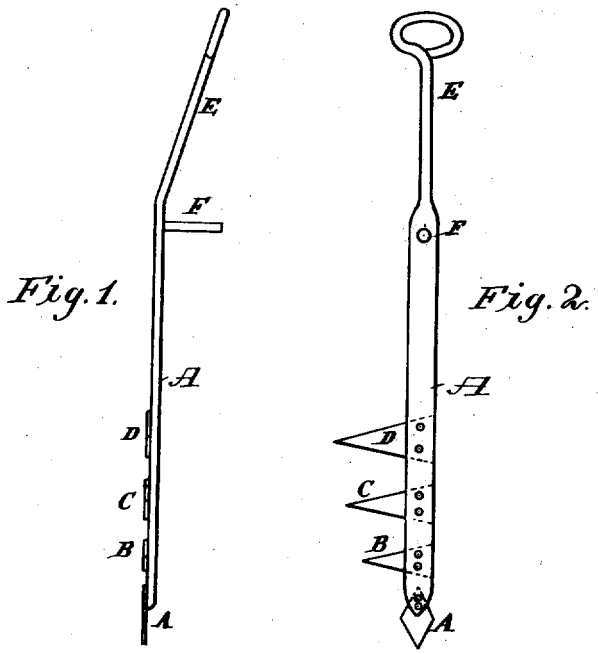
*Fig. 1.* *Fig. 2.*
WITNESSES:
Henry N. Miller
C. Sedgwick
INVENTOR:
J. Offineer
BY Munn & Co.
ATTORNEYS.
N. PETERS, PHOTO-LITHOGRAPHER, WASHINGTON, D. C.

UNITED STATES PATENT OFFICE.

JAMES OFFINEER, OF ASHLAND, OHIO, ASSIGNOR, BY MESNE ASSIGNMENTS, TO HIRAM HOLT & CO., OF FARMINGTON, MAINE.

HAY-KNIFE.

SPECIFICATION forming part of Reissued Letters Patent No. 9,335, dated August 3, 1880.

Original No. 82,152, dated September 15, 1868. Application for reissue filed June 11, 1880.

*To all whom it may concern:*

Be it known that I, JAMES OFFINEER, of Ashland, in the county of Ashland and State of Ohio, have invented a new and useful Improvement in Hay-Knives, of which the following is a specification.

Figure 1 is a perspective view of said knife. Fig. 2 is a side view.

Similar letters of reference indicate corresponding parts.

H is a strip or rod of iron, of suitable length and proper thickness, to which are connected two handles, E and F. At one end of the strip H is attached a two-edged lance-like pointed knife, A, and to the side of the strip are attached three sharp knives, B C D, one above the other, which knives are in shape isosceles triangles, and form saw-teeth upon the strip or bar. The middle knife, C, is longer than the bottom one, and the upper one, D, still longer.

At the upper end of rod H two handles, E F, are attached, and the rod is formed with a crook at the handle F, so that both handles offset from the plane of the cutting-blades, and the upper hand of the operator will be prevented from rubbing against the hay or straw when the knife is in use.

In operating the knife the lance-pointed knife A will cut both ways, thus opening the way for the easy entrance of the rod H, while by the sawing-like action of the knives B C D they cut rapidly and with great ease.

Having thus described my invention, I claim as new and desire to secure by Letters Patent—

1. The combination, with the bar H, of the end knife, A, and one or more saw-teeth sharpened on their edges, the end knife being placed in line with and the saw-tooth or saw-teeth at right angles to said bar, as and for the purpose specified.

2. In hay-knives, two or more angular knives arranged at right angles to the side of handle-bar H, and successively longer as they are farther removed from the point or end knife of the handle, to operate as specified.

JAMES OFFINEER.

Witnesses:
S. R. JONES,
J. D. JONES.